Nov. 3, 1931.  G. W. RILEY  1,830,445
FASTENING DEVICE
Filed Aug. 26, 1929
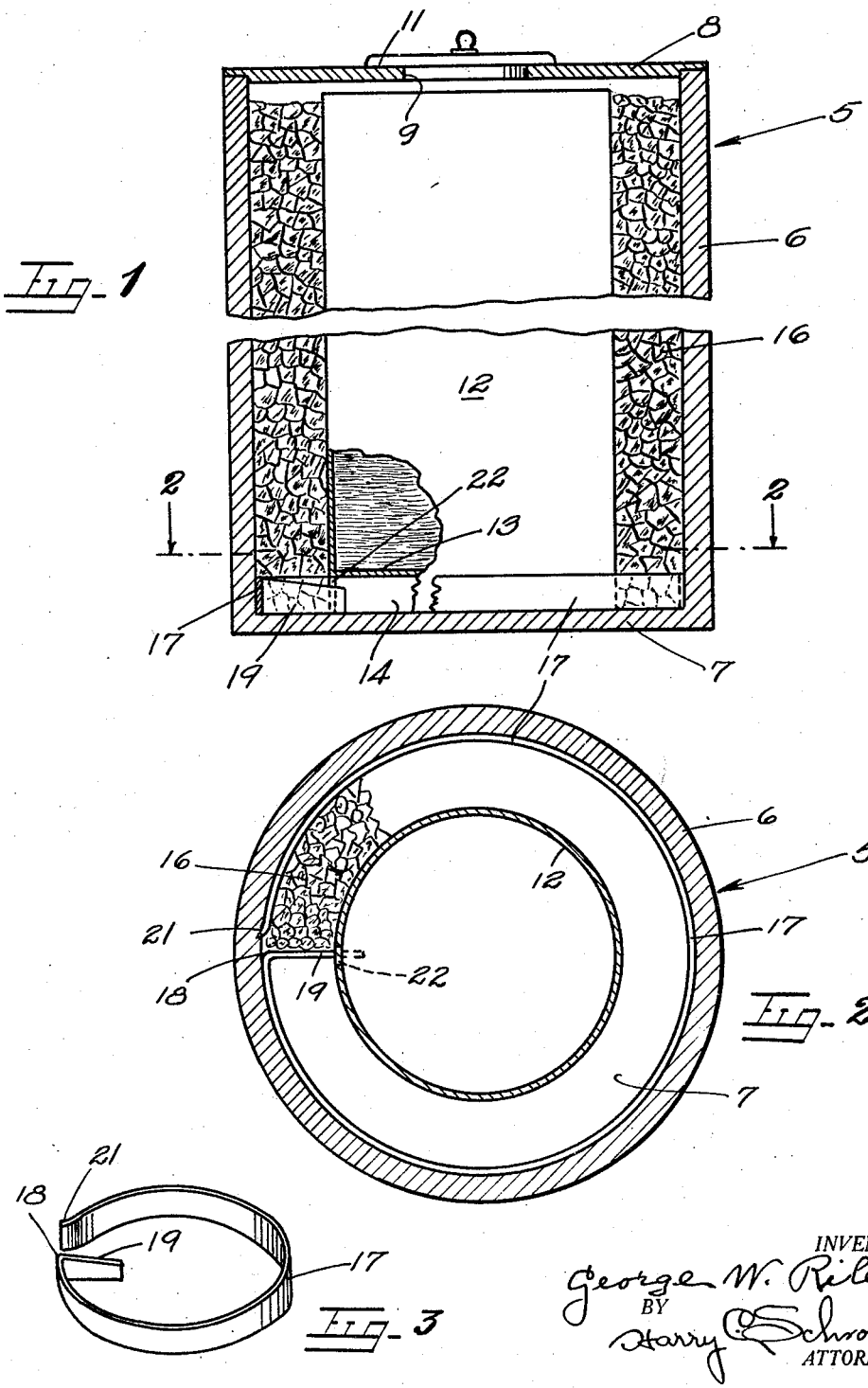
INVENTOR.
George W. Riley
BY
Harry Schroeder
ATTORNEY Patented Nov. 3, 1931

1,830,445

UNITED STATES PATENT OFFICE

GEORGE W. RILEY, OF ALBANY, CALIFORNIA

FASTENING DEVICE

Application filed August 26, 1929. Serial No. 388,384.

The invention forming the subject matter of this application relates to fastening devices and more particularly to a fastening device adapted for use in connection with the usual cylindrical metal ice cream container and receptacle therefor.

The primary object of the invention is to provide a fastening device for preventing rotation of an ice cream container relative to the receptacle into which the container loosely fits and is surrounded by packed ice.

Another object of the invention is to provide a fastening device of the character indicated, which can be readily made of sheet metal stampings and which at the same time is light and strong.

Another object of the invention is to provide a fastening device of the character indicated which is highly useful and simple in construction. Convenience of arrangement, lightness and comparative inexpense of manufacture are further objects which have been borne in mind in the production and development of the invention.

With the foregoing and other objects in view, which will be made manifest in the following detailed description and specifically pointed out in the appended claims, reference is had to the accompanying drawings for the illustrative embodiment of the invention wherein:

Fig. 1 is a longitudinal sectional view of an ice box with an ice cream container disposed therein and showing the fastening device of my invention in operative position therein;

Fig. 2 is a transverse sectional view taken on the line 2—2 of Fig. 1;

Fig. 3 is a perspective view of the fastening device forming my invention.

Referring to the accompanying drawings wherein similar reference characters designate similar parts throughout, the various figures described above adequately illustrate my invention, and the following detailed description is commensurate with the above mentioned drawings in enabling an artisan to construct and assemble the constituent parts of the same.

In carrying out my invention I make use of the usual ice box or receptacle designated by the numeral 5. As shown in the accompanying drawings the ice box comprises a cylindrical side wall 6, a bottom 7, and a removable top 8. Centrally positioned in the top 8 is a circular opening 9 which is closed by means of a removable cover 11.

Disposed within the box 5 is a cylindrical metal ice cream container 12 of the usual construction, wherein the bottom 13 thereof is offset from the extreme end of the container by means of an annular flange 14 which usually forms an integral part of the walls of the container. The foregoing is a description of the usual type of the cream equipment as installed in stores which vend ice cream. When a container 12 of ice cream is placed in the box 5 it is packed on all sides with cracked ice, as indicated at 16, which ice serves to keep the ice cream in its frozen state.

In the well known manner, the ice cream is vended by removing the same from the container 12 with a specially constructed ice cream scoop which resembles a ladle, which scoop is forced into the frozen cream and given a slight turn in order to completely fill the same and then removed. It has been found that in removing the ice cream from its container it often times happens that the force necessary to scoop the ice cream from the container generally turns or rotates the container relative to the box 5 making it very difficult to remove the ice cream, and necessitates the holding of the container with one hand while the scoop is operated with the other hand.

With the object in view of providing a means for preventing the aforesaid turning of the container 12, I have constructed a device for positively fastening the said container against turning to the box 5 in a manner which will allow removal of the same from the box when it becomes necessary to replace an empty container with a full one, the containers of course being of similar construction. Said device consists of a ring 17 formed of a substantially narrow strip of spring metal. The ends of the ring 17 are unattached and may be contracted to any desired size. One of the ends of the ring 17 is bent inwardly as at 18 so as to extend towards the center of said ring forming a radially extending portion 19, while the other end of said ring is given an outward bend, as at 21.

It is desired that the diameter of the ring 17 be slightly larger than the interior diameter of the box 5 so that in placing the ring within the box the same will have to be contracted in order to fit therein. The ring is positioned so as to rest on the bottom 7 of the box 5 in the manner shown in Fig. 1, and the outward tension thereof serves to hold the same in frictional engagement with the inside circumference of the wall 6 in a manner which will prevent the turning thereof relative to said box. In this respect the outwardly bent end 21 will bite into the wall 6 and provide a further fastening for the ring 17.

The container 12 is provided with a longitudinal kerf 22 in the flange 14 thereof, which kerf, when the can is placed in position in the box 5 fits over and engages the inwardly turned portion 19 of the ring 17 in the manner clearly shown in Figures 1 and 2. In this manner the can is fastened against turning in the box 5 by a device that is both simple and effective, and which may be readily adapted to the equipment now in use without altering any of the said equipment, with the exception of forming the kerf 22 in the ice cream containers.

It will be recognized that a very facile device is provided to accomplish the above described fastening of ice cream containers and one which combines light weigh with a ruggedness of construction and positiveness of operation particularly adapting it for its use. Being of a unitary character the device readily lends itself to installation by the labor ordinarily available.

I am aware that some changes may be made in the general arrangement of the said device as well as in the details of construction thereof without departing from the scope of the present invention as set forth in the foregoing specification, and as defined in the following claims; hence I do not limit my invention to the exact arrangement of the said device as described in the said specification, nor do I confine myself to the exact details of construction as illustrated in the accompanying drawings. The minor details in the construction will at all times of course, be performed within the scope and spirit of the subjoined claims.

What I claim is:

1. In combination with a receptacle and a cylindrical container disposed therein said container having a depending annular flange formed at the base thereof, said flange being provided with a kerf extending vertically from the bottom edge thereof, a resilient expansible split ring removably disposed in said receptacle and frictionally engaging the wall thereof and having an end thereof bent inwardly so as to be receivable in said kerf as and for the purpose set forth.

2. A rotation preventing device for cylindrical containers comprising a tongue engaging a slot in a depending flange on said container, said tongue extending inwardly from one terminal of a split resilient ring, the other terminal of said ring having an outwardly engaging end adapted to engage the inner wall of a receptacle for said container.

3. A retainer comprising a flat strip of spring metal formed to cylindrical shape and having a tongue portion formed from one end toward the axis, the other end being formed with an engaging portion adapted to engage the inner wall of a receptacle for a container, said tongue being adapted to cooperate with a slot formed in the depending flange of said container.

In testimony whereof I have affixed my signature.

GEORGE W. RILEY.